United States Patent
Fox

(10) Patent No.: US 8,565,380 B2
(45) Date of Patent: Oct. 22, 2013

(54) METHOD AND APPARATUS PERTAINING TO USE OF A SWITCHED VOLTAGE CLAMP WITH AN X-RAY DETECTOR AMPLIFIER

(75) Inventor: Timothy R. Fox, Chicago, IL (US)

(73) Assignee: Varian Medical Systems, Inc., Palo Alto, CA (US)

( * ) Notice: Subject to any disclaimer, the term of this patent is extended or adjusted under 35 U.S.C. 154(b) by 278 days.

(21) Appl. No.: 12/898,235

(22) Filed: Oct. 5, 2010

(65) Prior Publication Data

US 2012/0082297 A1    Apr. 5, 2012

(51) Int. Cl.
*H05G 1/08*    (2006.01)

(52) U.S. Cl.
USPC ............................................. 378/91; 378/115

(58) Field of Classification Search
USPC ........ 378/91, 95, 96, 97, 98.8, 111, 112, 114, 378/115, 116
See application file for complete search history.

(56) References Cited

U.S. PATENT DOCUMENTS

| 3,819,859 A | 6/1974 | Borsuk et al. | |
| 5,057,922 A | 10/1991 | Kanai | |
| 2010/0020930 A1* | 1/2010 | Okamura | 378/62 |
| 2010/0215146 A1* | 8/2010 | Rao et al. | 378/62 |

OTHER PUBLICATIONS

Woodworth, "An Improved Walleye Television Camera," Naval Weapons Center; May 1970; 28 pages.
Application Note 3303: Get a Grip on Clamps, Bias and AC-Coupled Video Signals, from Maxim Integrated Products website: http://www.maxim-ic.com/app-notes/index.mvp/id/3303; Aug. 6, 2004; 8 pages.

* cited by examiner

*Primary Examiner* — Hoon Song
(74) *Attorney, Agent, or Firm* — Fitch, Even, Tabin & Flannery LLP

(57) ABSTRACT

An x-ray detector amplifier operably couples to an analog-to-digital converter interface and a switched voltage clamp is operably disposed there between. By one approach, the switched voltage clamp comprises a switched electrical connection to a constant potential (such as, but not limited to, ground). These teachings will accommodate a control circuit configured to control the switched voltage clamp. This can comprise, for example, controlling the switched voltage clamp in synchronicity with the pulsed x-ray source. These teachings will also accommodate an integrator operably connected between the x-ray detector amplifier and the analog-to-digital converter interface. In such a case, the switched voltage clamp and be controlled to remove substantially any voltage offset contribution of the x-ray detector amplifier (due, for example, to significant temperature excursions) to a signal that is integrated by the aforementioned integrator.

12 Claims, 4 Drawing Sheets

METHOD AND APPARATUS PERTAINING TO USE OF A SWITCHED VOLTAGE CLAMP WITH AN X-RAY DETECTOR AMPLIFIER

TECHNICAL FIELD

This invention relates generally to x-ray detectors and more particularly to the detection of pulsed x-ray sources.

BACKGROUND

X-ray detectors are known in the art. Many such detectors use a scintillator that reacts to x-rays by producing a corresponding light. A photodiode, in turn, detects this light. Unfortunately, photodiodes often exhibit a strong exponential response to temperature.

The analog detector output is usually amplified and then integrated prior to being converted to a digital form. Such circuitry tends to contribute to an output voltage offset but is itself reasonably stable in at least some regards with respect to temperature. That said, and although the input offset voltage of a corresponding amplifier may be relatively constant, the contribution of this amplifier to an input-referred error current can depend significantly on variations in the photodiode resistance.

Accordingly, when the overall circuit is designed for relatively low input currents, the total direct current gain of the circuit (in particular, the transresistance of the amplifier multiplied by the direct current (DC) integrator gain) is often large. This, in turn, tends to increase the output offset as well as drift. As a general result, then, as temperature increases the zero point can so significantly drift that it can become problematic to reliably distinguish small signal levels. While noise can also present issues in a given application setting, this issue with drift in fact comprises a separate and distinct area of concern.

BRIEF DESCRIPTION OF THE DRAWINGS

The above needs are at least partially met through provision of the method and apparatus pertaining to use of a switched voltage clamp with an x-ray detector amplifier described in the following detailed description, particularly when studied in conjunction with the drawings, wherein.

Elements in the figures are illustrated for simplicity and clarity (though the timing diagrams in a given figure are drawn to a shared temporal axis). Also, common but well-understood elements that are useful or necessary in a commercially feasible embodiment are sometimes not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, these various embodiments are suitable for use with a pulsed x-ray source. A corresponding apparatus can comprise an x-ray detector amplifier, an analog-to-digital converter interface operably coupled to the x-ray detector amplifier, and a switched voltage clamp operably disposed between the x-ray detector amplifier and the analog-to-digital converter interface.

By one approach, the switched voltage clamp can comprise an in-series capacitor. In any event, by one approach the switched voltage clamp comprises a switched electrical connection to a constant potential (such as, but not limited to, ground). By one approach these teachings will accommodate a control circuit configured to control the switched voltage clamp. This can comprise, for example, controlling the switched voltage clamp in synchronicity with the pulsed x-ray source.

These teachings will also accommodate an integrator operably connected between the x-ray detector amplifier and the analog-to-digital converter interface. In such a case, the switched voltage clamp and be controlled to remove substantially any voltage offset contribution of the x-ray detector amplifier (due, for example, to significant temperature excursions) to a signal that is integrated by the aforementioned integrator.

So configured, the switched voltage clamp can be selectively switched to thereby reduce a DC-offset at the analog-to-digital converter interface. These teachings are sufficiently successful to readily accommodate the use of relatively high-gain x-ray detector amplifiers. This, in turn, aids in properly distinguishing and hence processing small level signals notwithstanding operating-temperature extremes.

These teachings are readily practiced in conjunction with known approaches and hence can serve to greatly leverage the overall usability and practicality of employing such known approaches in harsh application settings. Furthermore, these teachings can be economically practiced. These teachings are also highly scalable and can be used with a wide variety of pulsed x-ray sources and corresponding detectors.

Figure 1:
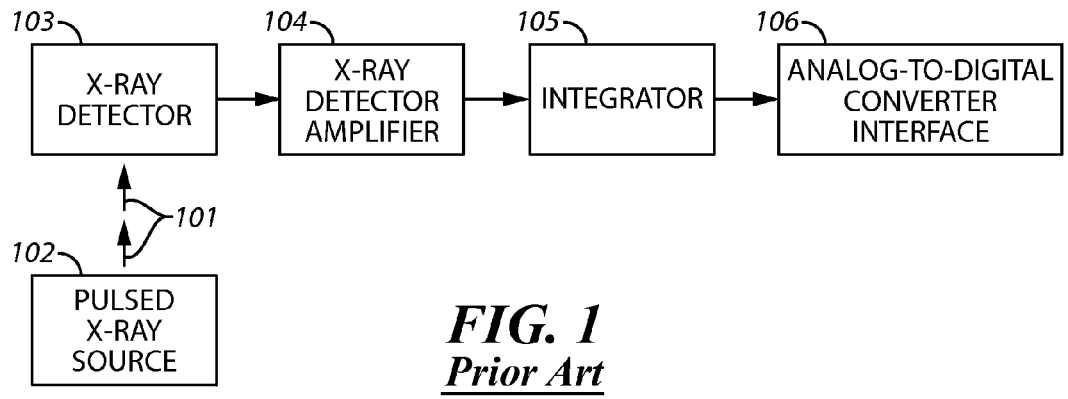
FIG. 1 comprises a block diagram as configured in accordance with the prior art.

These and other benefits may become clearer upon making a thorough review and study of the following detailed description. Referring now to the drawings, and in particular to FIG. 1, it may be helpful to first briefly describe and characterize an illustrative prior art analog processing chain in these regards.

Pulsed x-rays 101 as sourced by a pulsed x-ray source 102 are detected by an x-ray detector 103. Such a detector 103 comprises, in this example, an x-ray scintillator that optically couples to a photodiode. The output of this detector 103 feeds an x-ray detector amplifier 104 comprising, in this example, a transresistance feedback preamplifier (where the output voltage is proportional to the input current). So configured, the positive output current generated by the photodiode flows into the virtual ground of this preamplifier.

The direct current component of the preamplifier's output voltage corresponds to the photodiode's current times the feedback resistance of the preamplifier. Because this is a pulsed-current application setting, however, the voltage waveform at the preamplifier's output also depends upon the preamplifier's feedback capacitance as well.

An integrator 105 receives the output of the x-ray detector amplifier 104. In this example, the integrator 105 includes a parallel switch. Accordingly, this integrator 105 integrates the amplifier's output only so long as the switch is open. The analog samples to ultimately be digitally converted are defined in time by transferring the output of the integrator 105 ultimately to an analog-to-digital converter interface 106 followed by a short reset pulse that closes the switch to remove all charge from the integrator's capacitor. When the switch again opens the integrator resumes with the next sample.

Those skilled in the art will recognize that a given application setting may often include a large plurality of detectors and their corresponding signal processing chains. In such a case, track-and-hold components are often used in conjunction with a multiplexor to permit using a single analog-to-digital converter with the plurality of detectors. For the sake of simplicity, details in this regard are not shown here. It will be understood, however, that the teachings set forth herein are readily applied in either or both of a multiplexed and non-multiplexed application setting as desired.

The input to the analog-to-digital converter (not shown) must usually be positive. The offset voltage corresponding to this analog signal processing chain, however, can be of either polarity. Accordingly, a fixed bias voltage is often applied to the analog-to-digital converter's input to ensure that the total voltage at this input is always positive. While effective for the described purpose, this approach also necessarily reduces the available total range of signal that can be properly digitized and this can be particularly vexing in a multiplexed application setting. For example, when one chain's offset is a high positive value while another chain's offset is a high negative value (thereby necessitating use of a large gain value to compensate for the low signal values) the bias voltage must be a high positive value to remove the large negative offset. This, however, can push the signal from the chain with the high positive-valued offset beyond a level that the analog-to-digital converter can reasonably handle.

The present teachings employ a switched voltage clamp to aid in addressing such concerns when employing an analog signal processing chain for x-ray detectors in a pulsed x-ray application setting.

Figure 2:
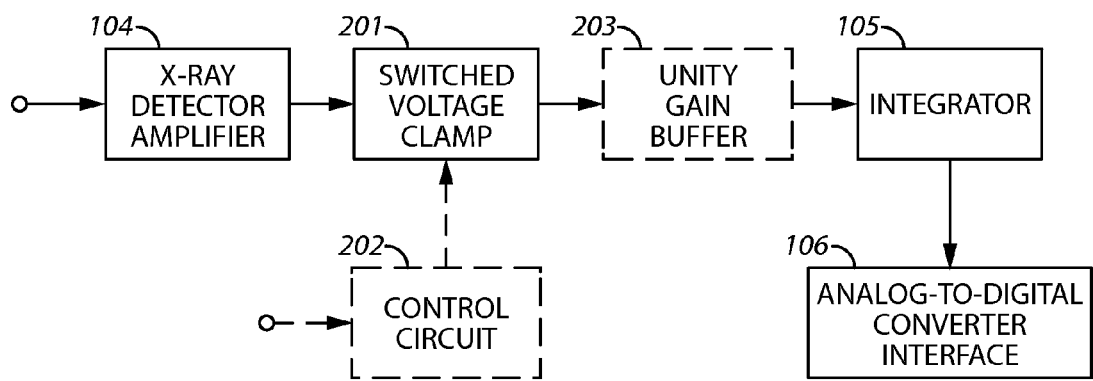
FIG. 2 comprises a block diagram as configured in accordance with various embodiments of the invention.

Generally speaking, and referring now to FIG. 2, this switched voltage clamp 201 operably couples between the x-ray detector amplifier 104 and the analog-to-digital converter interface 106. By one approach, this comprises placing the switched voltage clamp 201 between the x-ray detector amplifier 104 and an integrator 105. An optional control circuit 202 can serve to control the switched voltage clamp 201 (for example, by controlling the latter in synchronicity with the pulsed x-ray source as described below). These teachings will also optionally accommodate disposing a unity gain buffer 203 between the switching voltage clamp 201 and the integrator 105 if desired.

So configured, the switched voltage clamp 201 can be selectively switched to thereby facilitate reducing a direct current (DC)-offset at the analog-to-digital converter interface 106. By one approach, this can further comprise selectively controlling a switch that couples the x-ray detector amplifier 104 to the analog-to-digital converter interface 106 to effect reduction of a time interval of an integrand that accumulates in the integrator 105.

More particular examples in these regards will now be presented. It will be understood that these examples are intended to serve an illustrative purpose and that the specific details are not suggestive of any particular limits in these regards.

Figure 3:
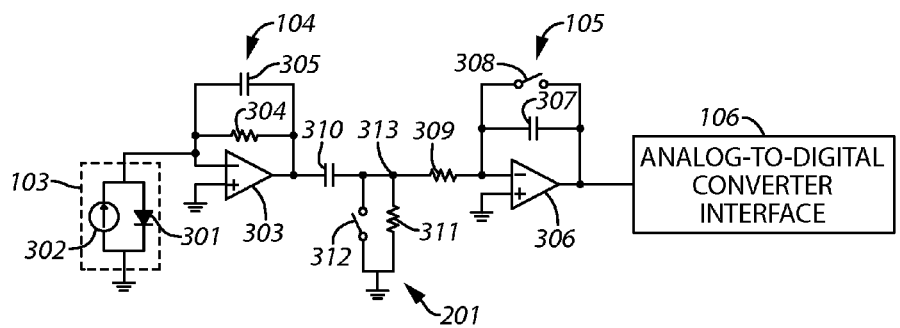
FIG. 3 comprises a schematic diagram as configured in accordance with various embodiments of the invention.

Referring, then, to FIG. 3, a relevant portion of the aforementioned x-ray detector 103 is represented as an equivalent circuit comprising both a photodiode 301 and a corresponding current generator 302 that represents the photocurrent generated by light from the detector's scintillator (not shown). The x-ray detector amplifier 104, in turn, comprises an operational amplifier 303 with a corresponding feedback resistor 304 and feedback capacitor 305 (where the transresistance parameter for this circuit typically essentially equals the resistance of the feedback resistor 304 and the feedback capacitor 305 determines the effective width of the output pulse voltage waveform when the input comprises a very narrow pulse of current) and the integrator 105 comprises another operational amplifier 306 having an integrator capacitor 307 and a reset switch 308. The integrator 105 couples to the analog-to-digital converter interface 106 and the x-ray detector amplifier's output couples to the integrator 105 via a series-connected resistor 309. These components generally comport with prior art practice with certain exceptions noted below as appropriate.

Per these teachings, in this illustrative example this signal-processing chain further comprises a switched voltage clamp 201 comprising a coupling capacitor 310 and a parallel-connected grounded resistor 311 and switch 312. When this switch 312 closes, the voltage at the clamp node 313 is forced to ground (which, in a typical application setting will be zero though other possibilities are of course possible). When this occurs, the clamp capacitor 310 will automatically charge to a voltage matching the output voltage of the preceding x-ray detector amplifier 104. Conversely, when the switch 312 opens, the capacitor 310 initially retains that previously-attained charge. This charge, however, slowly changes with the current drawn by the integrator input resistor 309 and the clamp discharge resistor 311. In general, for many application settings, this capacitor 310 will represent a large capacitance.

As a specific (but non-limiting example in these regards), consider an application setting characterized by a periodic pulse train having a repetition time of 3.0 msec. In such a case, this capacitor 310 could have a value of, for example, 220 nF. An even larger capacitance could be even better, but in many application settings the available area on the circuit board will be limited. In general, 100 nF to 10 µF might be suitable for many application settings depending on the period. In many cases it may also be useful to employ high-quality capacitors, such as NP0/C0G ceramic surface-mount capacitors.

Figure 4:
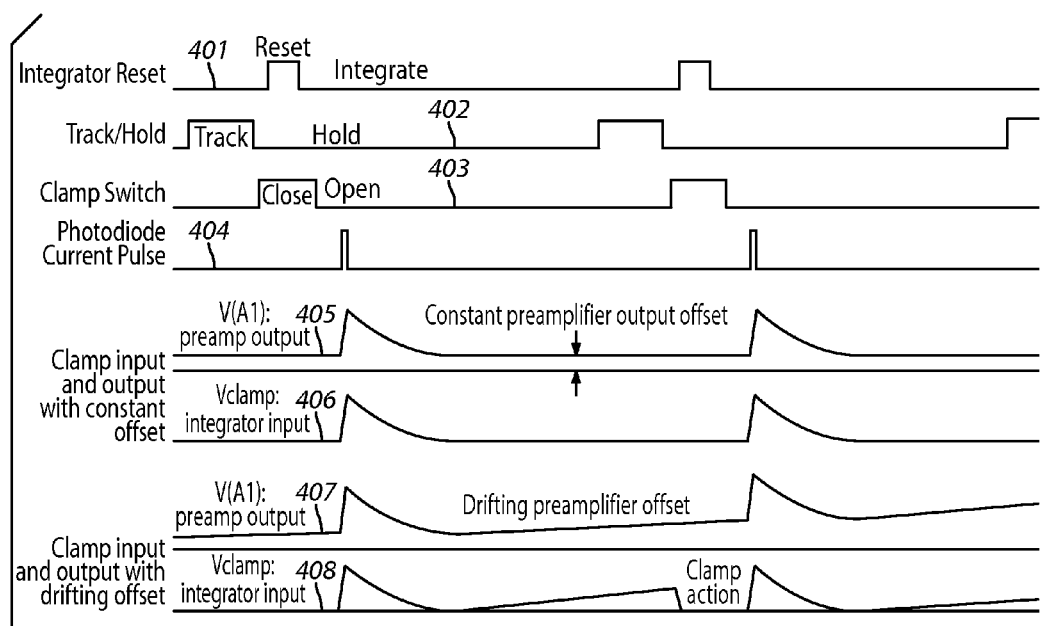
FIG. 4 comprises a timing diagram as configured in accordance with various embodiments of the invention.

FIG. 4 presents a set of timing diagrams 400 as correspond to the circuit shown in FIG. 3. These timing diagrams 400 generally represent a number of voltage waveforms and control pulses as pertain to that circuit.

The top timing diagram 401 depicts the reset pulse for the integrator switch 308. The second timing diagram 402 depicts a control pulse for switching a track-and-hold circuit as can comprise a part of the analog-to-digital converter interface 106 from a hold state to a track state. Together these facilitate cycling the detector. Upon the conclusion of a prior conversion cycle (presuming multiple conversions of a plurality of signal processing channels) the track-and-hold switch will switch from holding to tracking. (Note that for many application settings the period does not have to be literally constant. Instead, if desired, the time between start pulses can vary from pulse to pulse so long as there is sufficient time between them to accommodate the fixed time intervals mentioned here.)

When the aforementioned control circuit 202 receives a start pulse (not shown), the control circuit 202 can first switch the track-and-hold line from tracking to holding and then, a fixed time later, provide a fixed-width integrator reset pulse. This can help to ensure that the integrator output value is safely stored before the information is lost upon resetting the integrator 105.

The next timing diagram 403 depicts the control pulses for the voltage clamp switch 312. In this example, this pulse assures that this switch 312 changes from an opened state to a closed state after the track-and-hold switch changes to the hold state. This switch 312 will then change from the closed state to the open state before a next photodiode current pulse arrives. So configured, it can be seen that the switch-closed interval (where the desired clamping happens) occurs while there is no incoming signal present as this interval occurs between such incoming pulses (as represented in the next timing diagram 404, where each photodiode pulse comprises a narrow pulse that results from a pulse of radiation as emitted by a pulsed x-ray source 102 as noted above with respect to FIG. 1). Generally speaking (and as discussed below), for many application settings the clamp switch 312 should remain open long enough for the output waveform of a high-gain x-ray detector amplifier 104 to decay substantially. This time is typically much longer than the actual input pulse.

The remaining four timing diagrams depict signal waveforms. For the sake of simplicity and clarity, these waveforms are all shown as positive voltages. This, of course, will not always be true. These teachings are not limited to only-positive-voltage circumstances.

In this illustrative approach, the timing of the detector start pulse and the source trigger pulse is designed to ensure that the photodiode current pulse occurs after the reset and clamp switches 308 and 312 are in the state shown (i.e., to permit integrating and in the absence of clamping) and with enough time for the x-ray detector amplifier's response as shown in timing diagram 405 to decay to a negligible level before the clamping switch 312 next closes. As shown in the next timing diagram 406, the described circuit yields, as the output of the integrator 105 output, a voltage waveform and essentially tracks the voltage output of the x-ray detector amplifier 104 while eliminating a constant output offset as corresponds to that x-ray detector amplifier 104.

Every time the clamp switch 312 closes, the clamp capacitor 310 charges to the value required to maintain the output node 313 at zero volts (presuming ground to be at zero volts). So long as the capacitor discharge current (which is the sum of the input current of the next amplifier and the current through the clamp resistor 311 after the clamp switch 312 switches to an open-circuit state) can be neglected during the time between pulses, this voltage remains effectively constant. Accordingly, the quiescent value of the voltage at the integrator 105 input remains zero until the next pulse. That input voltage then follows the signal voltage at the output of the x-ray detector amplifier 104 until the next clamping action. In such a case the offset is essentially completely removed for all practical purposes.

The last two timing diagrams 407 and 408 depict the x-ray detector amplifier 104 output and the corresponding integrator 105 output when operating under a different operational constraint. In this example, instead of a constant output offset the x-ray detector amplifier 104 presents a drifting offset (shown here as a generally-rising offset). Although the described circuit will not eliminate all offset-related error in such a case, the corrected results are still superior to an uncorrected approach.

For the sake of illustration, it should be noted that the relative magnitude of both the constant offset and the drifting offset has been considerably exaggerated in the timing diagrams 400 of FIG. 4.

When the capacitor 310 is sufficiently large, the small change in voltage caused by these relatively small currents can be tolerated without unduly affecting the efficacy of this approach. The current that tends to disturb the charge on the clamp capacitor 310 can be dominated by the signal voltage at the output of the switched voltage clamp (at the node denoted by reference numeral 313) that causes a current to flow through the relatively large integrator input resistor 309. The RC product of that resistor 309 and the integrator capacitor 307 can be determined and the resistor can be made larger with a corresponding decrease in the capacitor size for a similar integrator 105 performance. This, in turn, will reduce the discharge current on the clamp capacitor 310.

Otherwise, if desired, a buffer amplifier can be additionally disposed between the switched voltage clamp 201 and the integrator 105. Presuming use of a high-impedance amplifier, such an approach can serve to further reduce the relevant discharge current.

Figure 5:
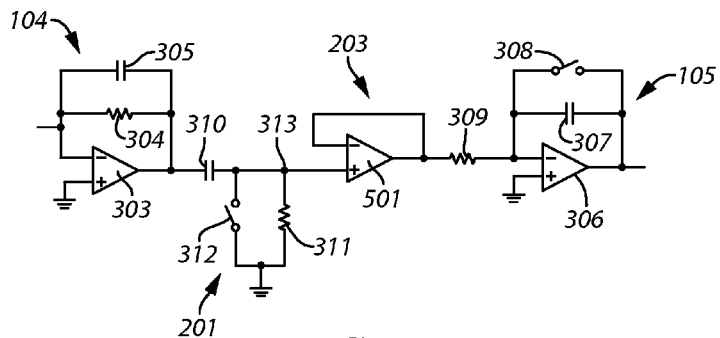
FIG. 5 comprises a schematic diagram as configured in accordance with various embodiments of the invention.

FIG. 5 illustrates one approach is such a regard. Here, the buffer amplifier 203 comprises a unity-gain amplifier 501. In such a case the clamp resistor 311 can be made very high to serve to keep the circuit within desired bounds should the clamp switch 312 stay open too long due, for example, to system inactivity. (As a specific non-limiting example in these regards, using a 220 nF clamp capacitor and a period of 3 msec, a clamp resistor 311 of 20 MΩ (time constant of 4.4 sec) produces a discharge current at 5 V signal of only 250 nA which shifts the voltage across the clamp capacitor by only 3.4 mV. This represents a linear gain slightly less then unity, in this example <0.1% change in gain. Resistor values up to 100 MΩ are readily available for this purpose. Temperature-stable buffer amplifiers (exhibiting very low voltage drift) are available with input currents <0.4 nA over a very wide temperature range (−40 to +125 C).) A suitable operational amplifier can draw only negligible current from the switched voltage clamp 201 over the entire voltage range present at the clamp output node 313 while supplying sufficient current through the integrator input resistor 309 to drive the integrator 105.

Figure 6:
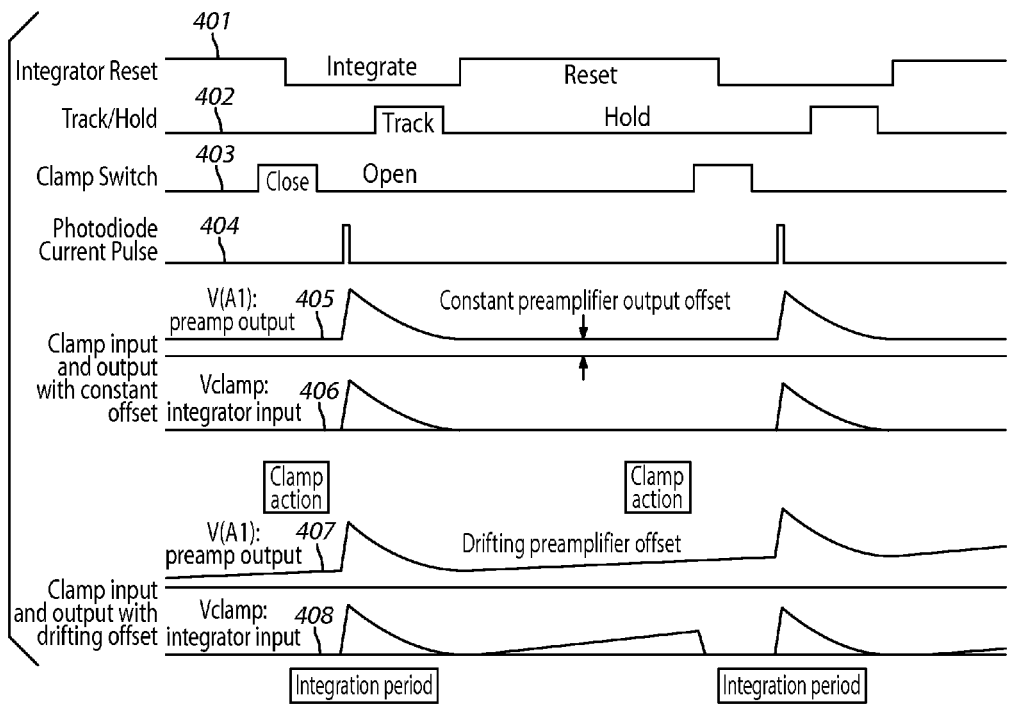
FIG. 6 comprises a timing diagram as configured in accordance with various embodiments of the invention.

FIG. 6 presents a set of timing diagrams 600 that correspond to the same control pulses and waveforms as were previously described with respect to FIG. 4. The last two timing diagrams 407 and 408 present an exaggerated drift of the offset between source pulses (timing diagram 404). Even presuming more likely and ordinary behavior in these regards, however, the offset drift ramp, even after the clamping action, may be enough to present a problem following integration. To address this issue one can move the source trigger and resulting input current pulse to a later time with respect to the detector integrator reset and the track-and-hold pulses.

To aid in reviewing these timing diagrams, 600 the "clamp action" and "integration period" intervals are denoted as floating boxes. The start of the integration period occurs while the clamp switch 312 is closed (i.e., during the "clamp action") so that the integration starts from zero. This approach also has the end of the integration interval be after both the source trigger pulse and after the track-and-hold functionality switches from tracking to holding.

By one approach, the change from tracking to holding is late enough such that the decay of the preamplifier output voltage is accomplished. In such a case the voltage ramps following the x-ray detector amplifier 104 decay (shown in the final timing diagram 408) will be rejected by the integrator's reset switch 308 and will not contribute to the final analog-to-digital converter output.

Figure 7:
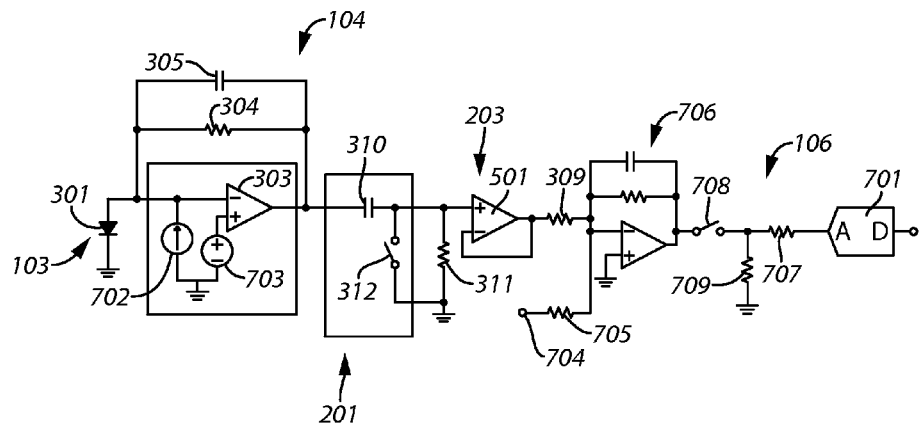
FIG. 7 comprises a schematic diagram as configured in accordance with various embodiments of the invention.

FIG. 7 depicts yet another illustrative offering in these regards. While the circuit examples presented above are quite suitable for use in a multiplexed setting where a plurality of such signal-processing chains share a single analog-to-digital converter, FIG. 7 depicts a circuit that works particularly well when associating each signal-processing chain with a single analog-to-digital converter 701.

In this illustrative example the x-ray detector amplifier 104 is shown with a representation of the direct current error sources that are inherent to a physical amplifying circuit. This includes an equivalent input current generator 702 disposed in parallel with the input node and an equivalent input voltage generator 703 disposed effectively in series with the input node. Both of these equivalent elements are temperature dependent. Those skilled in the art will understand that these are not physical generators per se, but rather a useful representation of the drift performance of the x-ray detector amplifier 104. In many cases their values are actually specified in the data sheet for such a component.

The quiescent output voltage at this amplifier's output, when the photodiode 301 current is zero, is a function of both generators 702 and 703 along with the feedback resistor 304 and the electronic parameters of the photodiode 301. In many application settings the dominant term for temperature drift is the relatively-constant voltage offset voltage generator 703, where the change in output voltage results from rapid changes in the effective resistance of the photodiode 301 with temperature. (Typically, this effective resistance falls by a factor of 2 for a temperature rise somewhere between 5° and 8° C. for a large-area silicon photodiode.)

The output voltage due to the input offset voltage is given by:

$$V_{out}=V_{EP}\times[1+(R_{RF}/R_{PD})]$$

where $R_{PD}$ is the approximate resistance of the photodiode 301, $V_{EP}$ is the voltage across the voltage generator 703, $R_{RF}$ is the resistance of the feedback resistor 304, and $R_{PD}$ is the resistance presented by the photodiode 301. In many cases the temperature changes in $V_{EP}$ and $R_{RF}$ themselves are small compared with the rapid change in $R_{PD}$ with temperature. The equivalent input current ($I_{INeff}$) (equal to a real current that gives this output) in turn is determined by the feedback resistor 304:

$$I_{INeff}=V_{out}/R_{RF}=V_{EP}\times[(1/R_{RF})+(1/R_{PD})]$$

which is equivalent to the input voltage generator flowing through the parallel combination of the feedback resistor 304 and the photodiode 301. The parallel resistance will be dominated by the smaller resistor value of these two components. This current value "referred to the input" can be compared directly with the actual signal current to evaluate the error.

When the circuit is designed for use with extremely low input signals, then the feedback resistor 304 will typically be relatively large. At high temperature it may be much larger than the photodiode 301 resistance, so the change in output voltage is roughly proportional to the change in the photodiode 301 resistance. For detectors that must operate at high uncontrolled temperatures (perhaps >40° C.), the exponential decrease in the resistance of the photodiode 301 $R_{PD}$ means that $(\Delta V_{out})/(\Delta V_{EP})$ becomes a very fast function of temperature changes from high starting temperatures.

As a specific non-limiting example in these regards, large photodiodes for security scanners (having, for example, a 4×30 mm active area) have a corresponding resistance of approximately 250 MΩ at room temperature, which decreases by a factor of 2 for every 5 to 8 degrees C. temperature increase. At 40 C, this could be only 30 MΩ (15 degree C. rise). Depending on the design value for input current, the feedback resistor could be, for example, between 2 and 200 MΩ, but could be up to 1000 MΩ for a very low input current system.

When the switch 312 of the switched voltage clamp 201 is open, the right end of the capacitor 310 follows the voltage at the output of the x-ray detector amplifier 104, except for changes in the voltage across the capacitor 310 caused by current flowing at the switch connection, including:

leakage current in the switch when "off;"
input current in the following amplifier 501; and
current through the clamp resistor 311 caused by the input voltage to the following amplifier 501.

Again, a buffer amplifier 501 serves to minimize the input current that affects the voltage across the clamp capacitor 310. A very large clamp resistor 311 may also be appropriate for many application settings since the clamp switch 312 may be open for a very long time during abnormal operation and the unterminated input of the buffer amplifier 501 can otherwise go to an undetermined voltage.

A second amplifier 706 is helpful to include when the polarity of the signal applied to the analog-to-digital converter 701 requires inversion, this being a convenient point to shift the direct-current level of the signal. Many analog-to-digital converters suitable for such an application can only convert positive signals, so it can be helpful to add a small positive bias to assure that the net offset is always positive. This, of course, must be done carefully to avoid undue drift in the offset due to that bias source. In this illustrative circuit this offset bias comes from a stable voltage Vbias 704 flowing through a high-quality resistor 705, with the second amplifier 706 effectively acting as an analog summing circuit. (As another specific but non-limiting example in this regard, typical resistors for the inverter amplifier could be 1.0 to 10 kΩ, which are commercially available in networks of matched resistors where the tracking is very precise (for example, 1 ppm/deg C). With resistance this low, the amplifier input currents (<0.4 nA) will typically not cause an important error.

In this illustrative example the analog-to-digital converter 701 comprises a component having an integral front-end integrator to integrate the current flowing into its input. Accordingly there is no discrete integrator stage as in the previous illustrated examples. Since the output of the second amplifier 706 is a voltage, the input resistor 707 to the analog-to-digital converter 701 serves to determine the current flowing into the analog-to-digital converter virtual-ground input.

This illustrative example includes an optional in-line output switch 708. Such a switch can serve at least two important functions. First, this output switch 708 can be opened during times when there may be glitches induced by the cycle of the clamp switch 312. Opening this output switch 708 at such times can aid in keeping corresponding spikes out of the integrated current. Second, by one approach this output switch 708 may be closed only during the time when the pulsed waveform out of the x-ray detector amplifier 104 is large, thereby reducing the influence of the offset in the second amplifier 706 on the current to the integrating input.

When using this output switch 708, the leakage current from the power supplies (not shown) when the switch is open may be excessive for the sensitive input of the analog-to-digital converter 701. A grounded resistor 709, having much lower resistance than the input resistor 707 to the analog-to-digital converter 701, can be added to shunt this leakage current away from the integrated circuit input to alleviate this potential source of drift. As a specific but non-limiting illustrative example in these regards, the input resistor to the analog-to-digital converter input could be 12 MΩ, and the extra grounded resistor could then be 10 kΩ. For many application settings the input resistor can comprise a precision component while the grounded resistor is not.

Since the switched voltage clamp 201 removes direct current from the x-ray detector amplifier output, the drift of the remaining circuit will be largely determined by the drift of the following amplifiers (i.e., the unity gain amplifier 501 and the second amplifier 706). As these amplifiers will typically have much lower gain and impedance levels and lack highly temperature-dependent components, their design can be relatively straightforward as will be well understood by those skilled in the art.

It may be noted that if there is a steady light leak onto the photodiode 301, there will be no response through the switched voltage clamp 201. Other interfering signals (light or electronic) affecting the x-ray detector amplifier 104 having frequencies lower than or comparable to the clamping cycle will essentially appear as sampled waveforms and contribute to the noise. As a result, for the most part the only signals that come through with full amplitude are signals, such as the x-ray pulse itself, that are synchronous with the clamp control waveform.

With this in mind, by one approach there should be an integer relationship between the cycle of the switched voltage clamp 201 and the pulse cycle of the pulsed x-ray source 102. Specifically, there can be an integer number of source pulses (one or more) during every interval that the clamp switch 312 is open (and hence not shorting the signal to ground). If the pulsed x-ray source 102 and the x-ray detector 103 are controlled from the same control circuit, these cycles need not be at a constant frequency so long as that relationship holds.

For many application settings it can be useful to run exactly one pulse for every clamp cycle, so long as the time between pulses is sufficiently long for the clamp and digitizer circuits. Summing the digitized values together effectively increases the resolution of the digital output without penalty, so long as the analog-to-digital converter can accommodate the corresponding speed of operation.

Figure 8:
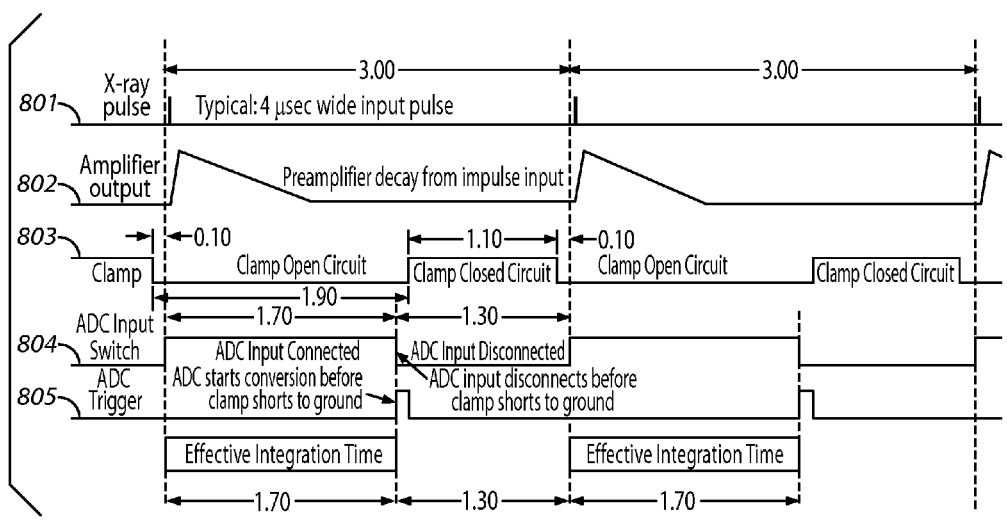
FIG. 8 comprises a timing diagram as configured in accordance with various embodiments of the invention.

FIG. 8 provides a number of timing diagrams 800 that correspond to one operating mode for the just-described signal-processing chain. The timing numbers shown in these timing diagrams 800 refer to a system where the x-ray source pulses every 3.0 milliseconds (0.003 seconds) (i.e., a 333 Hz pulse rate)

The first timing diagram 801 represents these x-ray pulses. The second timing diagram 802 represents the output of the x-ray detector amplifier 104. The third timing diagram 803 illustrates the open and closed states of the switched voltage clamp switch 312 while the fourth timing diagram 804 illustrates the same states for the output switch 708. The last timing diagram 805 illustrates operability of the analog-to-digital converter as juxtaposed against the integration function.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

I claim:

1. An apparatus for use with a pulsed x-ray source, comprising:
   an x-ray detector amplifier;
   an analog-to-digital converter interface operably coupled to the x-ray detector amplifier;
   a switched voltage clamp operably disposed between the x-ray detector amplifier and the analog-to-digital converter interface;
   a control circuit configured to control the switched voltage clamp wherein the control circuit is configured to control the switched voltage clamp in synchronicity with the pulsed x-ray source to thereby reduce a DC-offset at the analog-to-digital converter interface.

2. The apparatus of claim 1 wherein the switched voltage clamp comprises, at least in part, an in-series capacitor.

3. The apparatus of claim 2 wherein the switched voltage clamp comprises, at least in part, a switched electrical connection to a constant potential.

4. The apparatus of claim 3 wherein the switched voltage clamp comprises, at least in part, a resistor electrically connected in parallel with the switched electrical connection to the constant potential.

5. The apparatus of claim 3 wherein the constant potential comprises ground.

6. The apparatus of claim 1 further comprising:
   an integrator operably connected between the x-ray detector amplifier and the analog-to-digital converter interface, such that the switched voltage clamp substantially removes any voltage offset contribution of the x-ray detector amplifier from a signal that is integrated by the integrator.

7. The apparatus of claim 6 wherein the control circuit is configured to control the switched voltage clamp such that the switched voltage clamp clamps a circuit node corresponding to an output of the x-ray detector amplifier at a time when an input to the x-ray detector amplifier is known to be zero.

8. The apparatus of claim 6 further comprising:
   a switch connected in series with a signal input to the integrator, wherein the switch is controlled to reduce a time interval of an integrand that accumulates in the integrator.

9. The apparatus of claim 1 wherein the x-ray detector amplifier comprises a direct-coupled amplifier.

10. A method for use with a pulsed x-ray source, comprising:
    selectively switching a switched voltage clamp in synchronicity with the pulsed x-ray source, wherein the switched voltage clamp is disposed between an x-ray detector amplifier and an analog-to-digital converter interface to thereby reduce a DC-offset at the analog-to-digital converter interface.

11. The method of claim 10 wherein the x-ray detector amplifier comprises a high-gain x-ray detector amplifier.

12. The method of claim 10 further comprising:
    selectively controlling a switch that couples the x-ray detector amplifier to the analog-to-digital converter interface to reduce a time interval of an integrand that accumulates in an integrator that is coupled between the x-ray detector amplifier and the analog-to-digital converter interface.

* * * * *